(12) United States Patent
Naguib et al.

(10) Patent No.: US 11,493,621 B2
(45) Date of Patent: Nov. 8, 2022

(54) SECURE MULTICAST/BROADCAST RANGING

(71) Applicant: Apple Inc., Cupertino, CA (US)

(72) Inventors: Ayman Naguib, Cupertino, CA (US); Robert Brumley, Menlo Park, CA (US); Robert Golshan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 16/674,993

(22) Filed: Nov. 5, 2019

(65) Prior Publication Data

US 2020/0150261 A1    May 14, 2020

Related U.S. Application Data

(60) Provisional application No. 62/758,155, filed on Nov. 9, 2018.

(51) Int. Cl.
    *H04W 24/00*    (2009.01)
    *G01S 13/76*    (2006.01)
    *H04W 74/06*    (2009.01)

(52) U.S. Cl.
    CPC ........... *G01S 13/765* (2013.01); *H04W 74/06* (2013.01)

(58) Field of Classification Search
    CPC ......... H04W 4/02; H04W 4/06; H04W 12/63; H04W 12/61; H04W 64/003; H04W 4/80; H04B 1/7163
    USPC .... 455/456, 456.3, 456.1, 456.2, 404.2, 419
    See application file for complete search history.

(56) References Cited

U.S. PATENT DOCUMENTS

| | | | |
|---|---|---|---|
| 7,995,644 B2 | 8/2011 | Sahinoglu et al. | |
| 10,367,677 B2* | 7/2019 | Parkvall | H04J 11/0079 |
| 10,952,254 B2* | 3/2021 | Bhargava | H04W 74/0816 |
| 2004/0240565 A1 | 12/2004 | Santhoff et al. | |
| 2009/0247241 A1* | 10/2009 | Gollnick | G06K 7/1098 455/574 |
| 2010/0045508 A1 | 2/2010 | Ekbal et al. | |
| 2013/0315137 A1* | 11/2013 | Bhaskar | H04B 7/2125 370/324 |
| 2014/0301374 A1 | 10/2014 | Malkawi et al. | |

(Continued)

FOREIGN PATENT DOCUMENTS

| | | |
|---|---|---|
| CN | 101136818 | 3/2008 |
| CN | 101425914 | 5/2009 |

(Continued)

*Primary Examiner* — Joseph Arevalo
(74) *Attorney, Agent, or Firm* — Fay Kaplun & Marcin, LLP

(57) ABSTRACT

Methods performed by a first device. The methods include transmitting a first ranging poll to a plurality of second devices, receiving a polling response message from each of at least a first subset of the second devices, determining a propagation delay for each of the received polling response messages and determining a distance to each of the first subset of the second devices based on at least the respective propagation delays. The methods further include receiving a ranging poll from a second device, wherein the ranging poll is one of a multicast transmission or a broadcast transmission, determining a type of response to be transmitted to the second device based on at least a capability of the first device and transmitting a response of the determined type to the second device.

20 Claims, 5 Drawing Sheets

Multicast Ranging Operation 400

One ranging round 450

(56) References Cited

U.S. PATENT DOCUMENTS

2016/0277196 A1  9/2016 Jose et al.
2019/0297462 A1* 9/2019 Aljadeff ................ G01S 13/765

FOREIGN PATENT DOCUMENTS

| CN | 103037416 | 4/2013 | | |
|---|---|---|---|---|
| CN | 107409290 | 11/2017 | | |
| CN | 108029091 | 5/2018 | | |
| KR | 10-2017-0128324 | 11/2017 | | |
| WO | WO-2013025512 A1 * | 2/2013 | ........... | G01S 13/765 |
| WO | WO-2018011792 A1 * | 1/2018 | ........... | B64C 39/024 |
| WO | WO-2020169202 A1 * | 8/2020 | ........... | G01S 13/765 |

* cited by examiner

MAC IE 500

| Bits: 0-1 | 2 | 3 | 4 | 5 | | | | | | |
|---|---|---|---|---|---|---|---|---|---|---|
| PLG_Mode | SCND_Poll | CNT_Flag | R_TS_Report | O_TS_Report | BRDCST_Retrys | Ranging Rounds | | | [TBD] | [TBD] (Variable & only if multicast and scheduled) |
| | | | | | | No. of Rounds | Slots per Round | Slot Length | Round Counter | Pointer to Next Round | Slot Assignment |
| 00: Single<br>01: M_Cast<br>10: B_Cast<br>11: Res. | 0:<br>1: | 0: Contention<br>1: Scheduled | 0:<br>1: | 0:<br>1: | [TBD] | [TBD] | [TBD] | [TBD] | [TBD] | [TBD] | [TBD] |

Fig. 5

SECURE MULTICAST/BROADCAST RANGING

BACKGROUND INFORMATION

The IEEE 802.15.4 standard specifies a physical layer (PHY) and a media access control (MAC) layer for operation of low-rate WPANs (LR-WPANs). These types of networks are typically referred to as Ultra-Wideband (UWB) networks. UWB networks may connect wireless electronic devices in various arrangements. In one example, a UWB network may comprise a primary device and one or more secondary devices. The devices of the UWB network may perform various functionalities with respect to the other devices connected to the UWB network.

SUMMARY

Exemplary embodiments include a method performed by a first device. The method includes receiving a ranging poll from a second device, wherein the ranging poll is one of a multicast transmission or a broadcast transmission, determining a type of response to be transmitted to the second device based on at least a capability of the first device and transmitting a response of the determined type to the second device.

Further exemplary embodiments include a device having a transceiver and a processor. The transceiver is configured to transmit a first ranging poll to a plurality of second devices and receive a polling response message from at least a first subset of the second devices. The processor is configured to determine a propagation delay for each of the received polling response messages and determine a distance to each of the first subset of the second devices based on at least the respective propagation delays.

Still further exemplary embodiments include a method performed by a first device. The method includes receiving a ranging poll from a second device, wherein the ranging poll is one of a multicast transmission or a broadcast transmission, determining a type of response to be transmitted to the second device based on at least a capability of the first device and transmitting a response of the determined type to the second device.

BRIEF DESCRIPTION OF THE DRAWINGS

FIG. 5 shows an exemplary MAC Information Element (IE) according to various exemplary embodiments.

DETAILED DESCRIPTION

Figure 1:
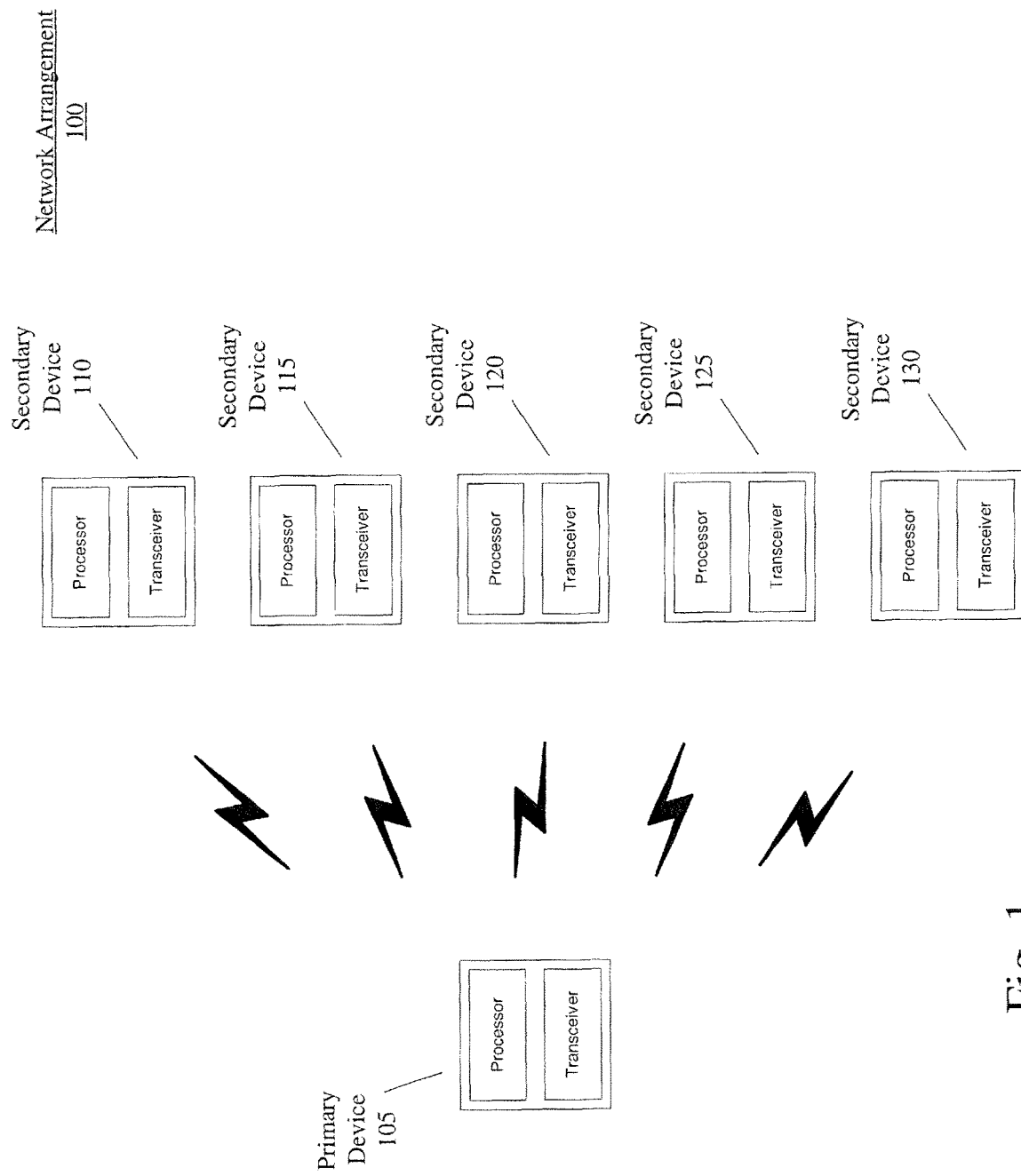
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments are related to a system and method for performing a secure broadcast or multicast ranging procedure in a UWB network. It may be desirable for a primary device in a wireless personal area network (WPAN) to determine a distance to one or more secondary devices. The exemplary embodiments describe a ranging procedure that allows the primary device to avoid an individual ranging procedure for each of the secondary devices, thereby decreasing a number of packets exchanged in the UWB network during ranging operations.

The exemplary embodiments are described with respect to devices that may operate according to the IEEE 802.15.4 standard. However, it should be understood that the exemplary embodiments of the ranging operation may be used by devices using any UWB protocol. In addition, the terms wireless personal area network (WPAN) and Ultra-Wideband (UWB) network are used interchangeably throughout this description and those skilled in the art will understand the general characteristics of such networks.

FIG. 1 shows an exemplary network arrangement 100 according to various exemplary embodiments. The exemplary network arrangement 100 includes a primary device 105 and a plurality of secondary devices 110-130. The primary device 105 and the secondary devices 110-130 may be any type of electronic component that is configured to operate within a UWB network, e.g., mobile phones, tablet computers, smartphones, phablets, embedded devices, wearable devices, Cat-M devices, Cat-M1 devices, MTC devices, eMTC devices, other types of Internet of Things (IoT) devices, access points, etc. It should be understood that an actual network arrangement may include any number of secondary devices. The example of five secondary devices 110-130 is only provided for illustrative purposes. It should also be understood that any of the devices 105-130 may be designated a primary device and similarly, any of the devices 105-130 may be designated as a secondary device for a particular ranging operation. That is, the device that initiates the ranging operation may be designated as the primary device.

The primary device 105 and the secondary devices 110-130 may be configured to communicate over the UWB network. However, it should be understood that the primary device 105 and the secondary devices 110-130 may also communicate with other types of wireless networks (cellular or non-cellular) and may also communicate using a wired connection. With regard to the exemplary embodiments, the primary device 105 and the secondary devices 110-130 may communicate over the UWB network to, among other functionalities, transmit or receive data.

Figure 2:
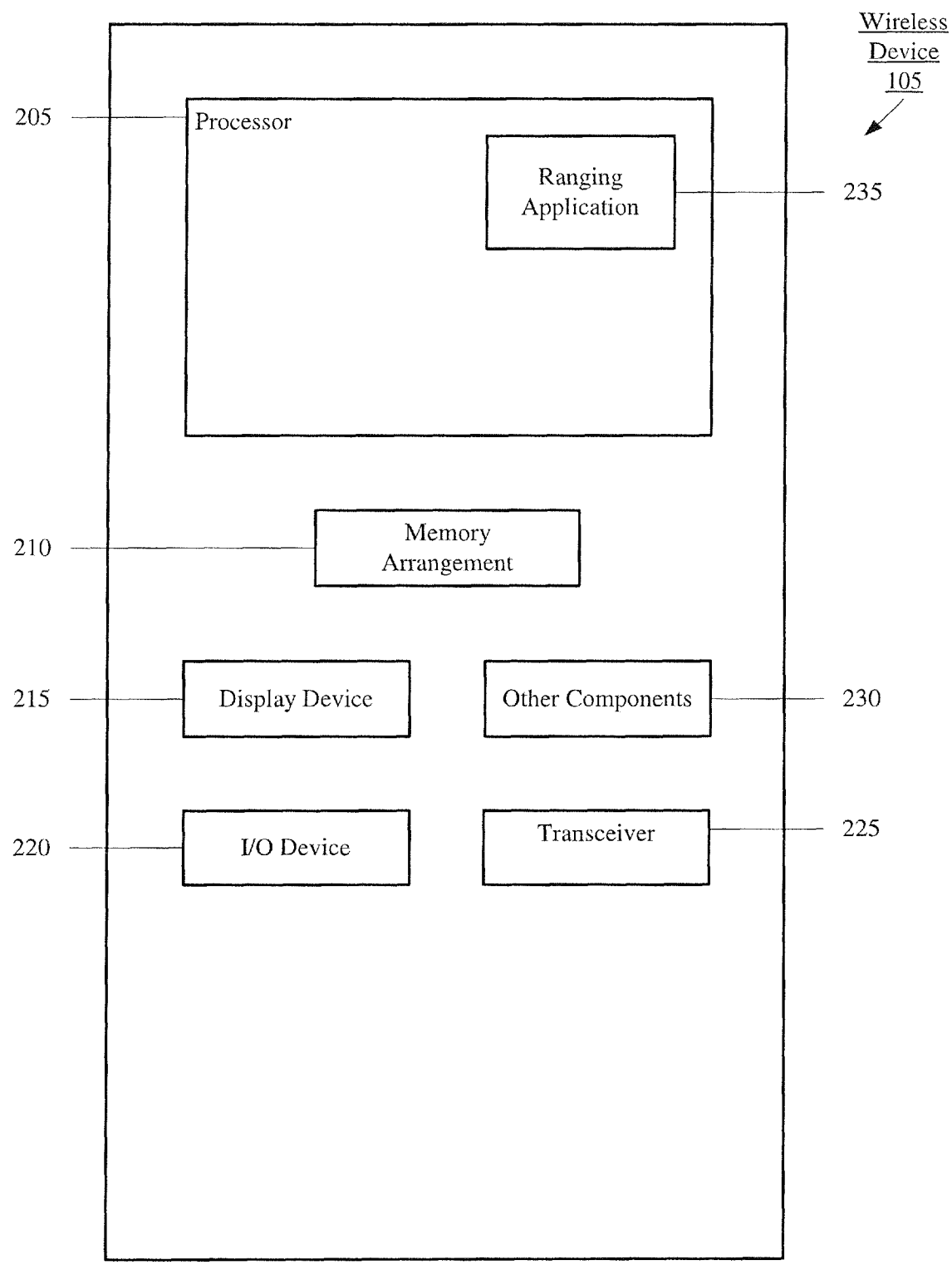
FIG. 2 shows an exemplary wireless device according to various exemplary embodiments.

FIG. 2 shows an exemplary wireless device 105 according to various exemplary embodiments. It should be understood that the exemplary wireless device 105 of FIG. 2 may also represent any of the other wireless device 110-130 of the network arrangement 100. The wireless device 105 may include a processor 205, a memory arrangement 210, a display device 215, an input/out (I/O) 220, a transceiver 225, and other components 230. The other components 230 may include, for example, an antenna, an audio input device, an audio output device, a battery, a data acquisition device, ports to electrically connect to other electronic devices, etc.

The processor 205 may be configured to execute a plurality of applications of the device 105. In one exemplary embodiment, an application may include a ranging application 235 as will be described in greater detail below. The described functionalities of the wireless device 105 being represented as an application (e.g., a program) executed by the processor 205 is only exemplary. The functionality associated with the applications may also be implemented as a separate incorporated component of the wireless device 105 or may be a modular component coupled to the wireless device 105, e.g., an integrated circuit with or without firmware. In addition, in some wireless devices, the functionality described for the processor 205 is split among two processors, a baseband processor and an application processor. The exemplary embodiments may be implemented in any of these or other configurations of a wireless device.

The transceiver 225 may be a hardware component configured to transmit and/or receive data. For example, the transceiver 225 may enable communication with other electronic devices directly or indirectly through one or more networks based upon a protocol and an operating frequency of the network. The transceiver 225 may operate on a variety of different frequencies or channels (e.g., set of consecutive frequencies). Thus, one or more antennas (not shown) coupled with the transceiver 225 may enable the transceiver 225 to communicate with other wireless devices (e.g., wireless devices 110-130) via a UWB network.

The exemplary embodiments describe the primary device 105 determining a distance to and/or a location of each of the plurality of secondary devices 110-130 using a ranging operation. Throughout this description, the term "distance" will be used to refer to the distance between devices and/or the location of the secondary device 110-130 either relative to the primary device 105 or an absolute location within a particular space. Three exemplary ranging modes are described. A single node ranging mode is utilized for determining a distance to a single secondary device, e.g. secondary device 110. A multicast ranging mode is utilized for determining a distance to a plurality of secondary devices, e.g. secondary devices 110-130, when the number and identity of the secondary devices 110-130 are known to the primary device 105. For example, in the network arrangement 100, the number of secondary devices is five. The identity of the secondary devices 110-130 may be known to the primary device 105 through any number of manners, e.g. previous data exchanges, previous ranging operations, etc. A broadcast ranging mode is utilized for determining a distance to a plurality of secondary devices, e.g. secondary devices 110-130, when the number of secondary devices and the identity of each of the secondary devices are not known to the primary device 105. However, even when the identities of the secondary devices 110-130 are not known to the primary device 105, the devices 105-130 may share a common key that may be used to receive station-to-station messages. For example, keys may be shared via an upper layer protocol either over the UWB network or a sideband channel.

The ranging application 235 may implement one or more of these ranging modes. In the below description, the operation of the exemplary multicast ranging mode and broadcast ranging mode will be described in detail. The single node ranging mode operation will not be described as that mode will operate in accordance with conventional ranging operations.

Figure 3:
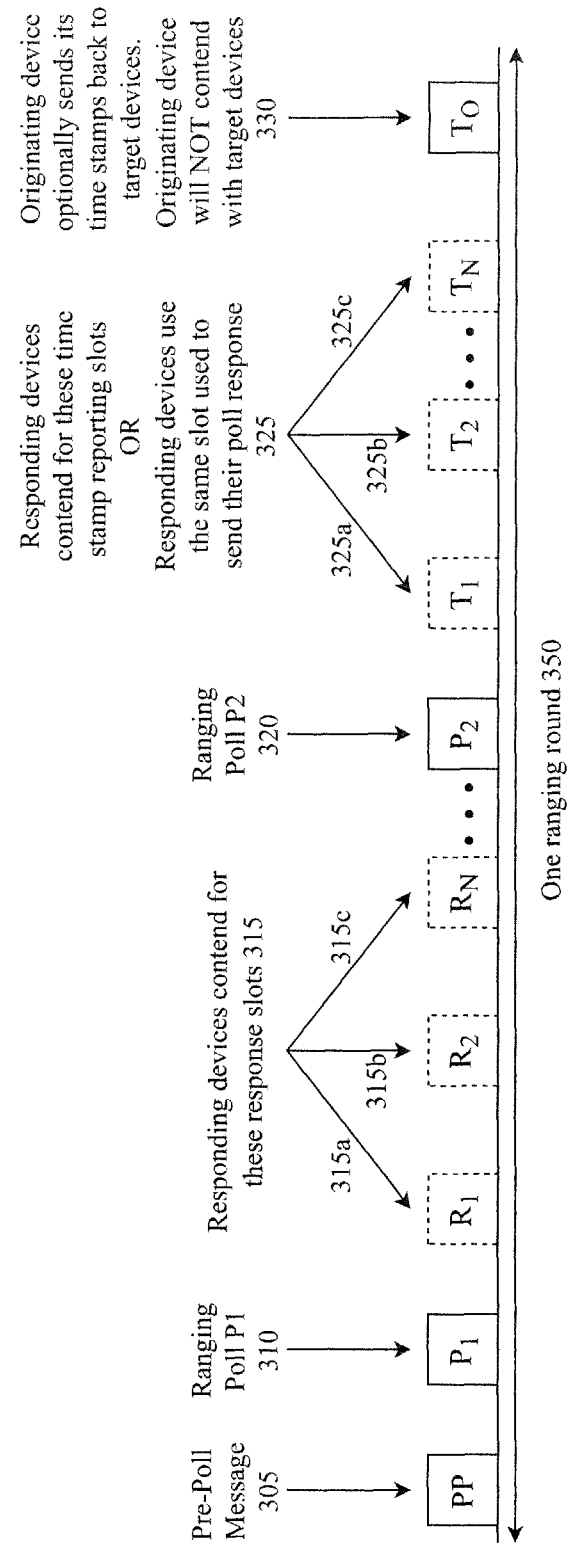
FIG. 3 shows a first exemplary timing diagram for a broadcast ranging operation according to various exemplary embodiments.

FIG. 3 shows a first exemplary timing diagram for a broadcast ranging operation 300 according to various exemplary embodiments. The broadcast ranging operation 300 will be described with reference to the network arrangement 100 of FIG. 1. As shown in FIG. 3, one exemplary ranging round 350 is illustrated. As will be described in greater detail below, there may be multiple rounds of ranging operations performed.

In the ranging round 350, the primary device 105 may transmit a pre-poll message 305 that includes ranging configuration information for the secondary devices 110-130. The pre-poll message 305 is not required to be transmitted in every ranging round. For example, the ranging round 350 may be a subsequent ranging round and a previous pre-poll message including the configuration information may have been sent by the primary device 105 and received by the secondary devices 110-130. Thus, the same configuration information is not required to be sent multiple times. In one example, the ranging configuration information may remain valid until a next pre-poll message is transmitted. In another example, the configuration information may be included in the ranging poll 210 (described below). In a further example, the configuration information may be included in other messages exchanged between the wireless devices 105-130, either via the UWB network or another network/protocol. In any case, the secondary devices 110-130 connected via the UWB network will receive the ranging configuration information.

The primary device 105 may then broadcast a first ranging poll 310 to the secondary devices 110-130 via the UWB network. The first ranging poll 310 may include various information allowing the secondary devices 110-130 to respond to the poll. This information of the first ranging poll 310 may be included in a MAC information element (IE) 500, as will be described in further detail with respect to FIG. 5.

The secondary devices 110-130 may contend for available polling response slots and respond to the first ranging poll 310 by transmitting polling response messages 315a-c to the primary device 105. The polling response slots are indicated as $R_1, R_2 \ldots R_N$, wherein N is a number of available slots. As will be described below, the number of available slots N may be configurable by the primary device 105.

After receipt of the polling response messages 315a-c by the primary device 105, it may be considered that the ranging round 350 is complete. For example, the primary device 105 may have received sufficient information in the polling response messages 315a-c to determine the distance to the secondary devices 110-130. However, a second ranging poll 320 of the same ranging round 350 may also be used. For example, if precise ranging with clock drift cancellation is used, the second ranging poll 320 and corresponding responses (described below) may be used. In another example, when a time stamp is not included in the polling response messages 315a-c, the primary device 105 may not be able to derive the propagation delay inherent in sending messages across a distance. For example, if the precise timing is known for the transmission of the polling response message by one of the secondary devices 110-130 and for the reception of the polling response message by the primary device 105, then the primary device 105 can derive the distance between the devices. Thus, when any one of the secondary devices 110-130 is not capable of including time stamps in the polling response messages 315a-c, the second ranging poll 320 may be used.

When the second ranging poll 320 is used, the primary device 105 broadcasts a second ranging poll 320 to the secondary devices 110-130 via the UWB network. The second ranging poll 320 may be substantially similar to the first ranging poll 310, with appropriate modifications to the MAC IE 400 to indicate the expected response is a time-stamp response.

The secondary devices 110-130 may then contend for available time stamp reporting slots and respond to the second ranging poll 320 by transmitting time stamp response messages 325a-c to the primary device 105. Alternatively, the secondary devices 110-130 may occupy the same slot as used to transmit the polling response messages 315a-c. It should be understood that the same slot means the same slot after the respective poll. For example, if the secondary device 110 transmitted polling response message 315a in slot $R_1$ after ranging poll 310, the secondary device 110 will transmit time stamp response message 325a in slot $T_1$. The timing response slots are indicated as $T_1, T_2 \ldots T_N$, wherein N is the number of available slots. The time stamp response messages 325a-c may each include a time stamp. The primary device 105 may use the respective time stamps to derive a distance between the primary device 105 and each of the plurality of secondary devices 110-130.

The primary device 105 may also transmit a message 330 comprising time stamps to the secondary devices 110-130. The primary device 105 may report its time stamps to allow the secondary devices 110-130 to independently derive the distance between the devices. Thus, after message 330 is transmitted, the ranging round 350 is complete.

Figure 4:
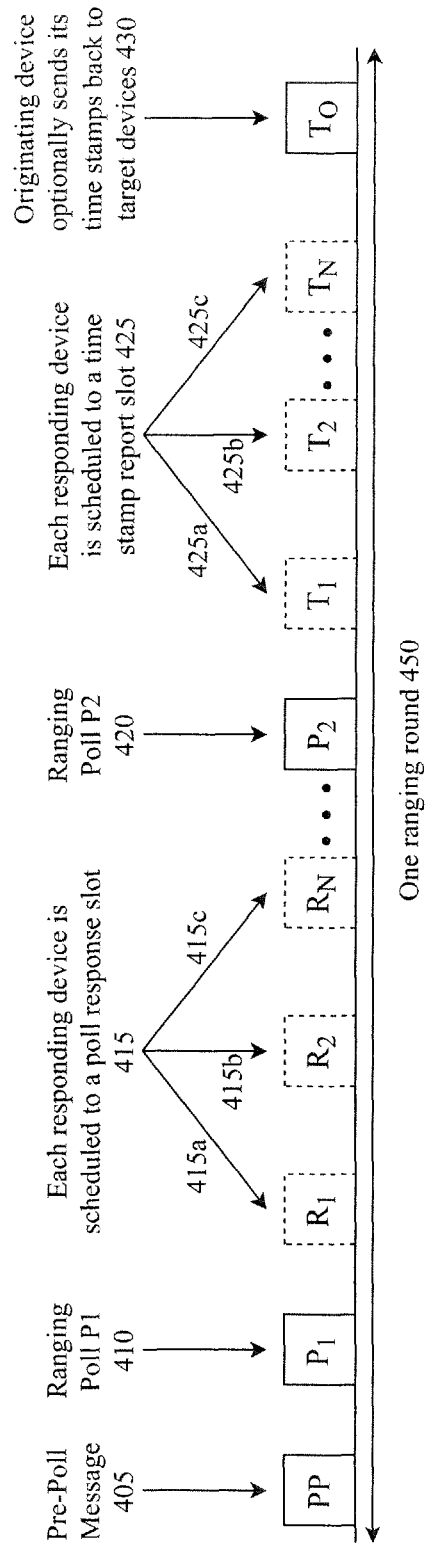
FIG. 4 shows a second exemplary timing diagram for a multicast ranging operation according to various exemplary embodiments.

FIG. 4 shows a second exemplary timing diagram for a multicast ranging operation 400 according to various exemplary embodiments. The multicast ranging operation 400 will be described with reference to the network arrangement 100 of FIG. 1. Again, the timing diagram of FIG. 4 will illustrate a single ranging round 450, but multiple rounds are possible.

The primary device 105 may transmit a pre-poll message 405 carrying ranging configuration information to the secondary devices 110-130 via the UWB network. The transmission of the pre-poll message 405 may be substantially similar to the transmission of the pre-poll message 305.

The primary device 105 may multicast a first ranging poll 410 to the secondary devices 110-130. The first ranging poll 310 may be substantially similar to the first ranging poll 310, with appropriate field adjustments to indicate multicast ranging, as will be described in further detail with respect to FIG. 5.

The secondary devices 110-130 may be scheduled to transmit polling response messages 415a-c in a polling response slot. The polling response slots are indicated as $R_1, R_2 \ldots R_N$, wherein N is a number of available slots. The polling response slot for each secondary device 110-130 may be scheduled by the primary device 105 because the number and identities of the secondary devices are known to the primary device 105. However, in another exemplary embodiment, the secondary devices 110-130 may contend for the polling response slots if no schedule is provided by the primary device 105.

Similar to the broadcast ranging operation 300 described with respect to FIG. 3, receipt of the polling response messages 415a-c may be considered to complete the ranging round 450. However, for substantially similar reasons as described above, a second ranging poll 420 may also be used.

The primary device 105 may multicast a second ranging poll 420 to the secondary devices 110-130 via the UWB network. The second ranging poll 420 may be substantially similar to the first ranging poll 410, with appropriate modifications to the MAC IE 400 to indicate the expected response is a timestamp response.

The secondary devices 110-130 may be scheduled to send time stamp response messages 425a-c in a time stamp report slot by the primary device 105. The time stamp report slot may be the same for a given secondary device as the poll response slot or may be a different slot. The time stamp report slots are indicated as $T_1, T_2 \ldots T_N$, wherein N is the number of available slots. The time stamp response messages 425a-c each include a time stamp. The primary device 105 may use the respective time stamps to derive a distance between the primary device 105 and each of the plurality of secondary devices 110-130.

The primary device 105 may also transmit a message 430 comprising time stamps to the secondary devices 110-130. The primary device 105 may report its time stamps to allow the secondary devices 110-130 to independently derive the distance between the devices. Thus, after message 430 is sent, the ranging round 450 is complete.

As described above, FIGS. 3 and 4 illustrate a single ranging round 350, 450, respectively. The ranging rounds may be repeated as necessary. For example, there may be a second ranging round and a third ranging round after a first ranging round. The ranging rounds do not need to be contiguous, e.g., there may be time gaps between ranging rounds. The time gap may be indicated in the MAC IE 500. With respect to the multicast ranging operation 400, the manner of sending polling response messages 415a-c, e.g., schedule-based or contention-based, may change from round to round.

In a further exemplary embodiment, the initial polling message may comprise two polling messages, wherein polling message P1 may be used by a first subset of the secondary devices 110-130 and a polling message P2 that may be used by a second subset, e.g. the remainder of the secondary devices 110-130. The first and second subsets may be determined based on an ability of a secondary device to transmit time stamps in the polling response message. As described above, the primary device 105 and the secondary devices 110-130 may exchange information about ranging capabilities. For example, if a secondary device has the capability of sending timestamp information in a polling response message, the secondary device may treat the ranging poll similar to the ranging polls 310 and 410 and respond with a polling response message similar to polling response messages 315, 415. On the other hand, if a secondary device does not have the capability of sending timestamp information in a polling response message, the secondary device may treat the ranging poll similar to the ranging polls 320 and 420 and respond with a timestamp response message similar to time stamp response message 325, 425.

FIG. 5 shows an exemplary MAC IE 500 according to various exemplary embodiments described herein. The MAC IE 500 defines various MAC fields to support the broadcast/multicast ranging operations described herein. For example, the MAC IE 500 may indicate the ranging mode as one of the single node ranging mode, the multicast ranging mode, or the broadcast ranging mode. The MAC IE 500 may further indicate a number of ranging rounds, a duration of each ranging round, and a number of available poll response slots. The number of poll response slots may be configurable by the primary device 105. For example, in the multicast mode where the primary device 105 is aware of the number of secondary devices 110-130, the primary device 105 may set the number of response slots based on the number of secondary devices, e.g., 5 slots when there are 5 secondary devices. The MAC IE 500 may also include a counter showing the number of the current exchange round (e.g. 3 of 5). If the ranging rounds are non-continuous (e.g. there is a time gap between rounds), the MAC IE 500 may point to a timing of a next poll (or pre-poll).

If the ranging mode is the multicast ranging mode, the MAC IE 500 may specify whether the secondary devices 110-130 are scheduled for poll response slots or will contend for poll response slots. If the secondary devices 110-130 are scheduled, the MAC IE 500 may also specify the slot assignments for each of the secondary devices 110-130.

However, this specification may also be indicated as part of the upper layer protocols. If the ranging mode is broadcast ranging, the MAC IE 500 may specify a maximum number of attempts for each of the secondary devices 110-130 to contend for a response slot.

As described above, the secondary devices 110-130 may contend for response slots. Legacy channel contention typically uses energy detection and preamble detection to sense a transmission medium prior to attempting a transmission. When a device senses that the transmission medium is in use, it will back off for a random time before sensing the medium again and attempting the transmission. Energy detection is typically not useful for UWB networks because UWB signals are transmitted at a very low power over a large bandwidth. In addition, IEEE 802.15.4 specifies that different UWB packets may use different preambles. Thus, sensing the transmission medium by preamble detection may be inefficient, considering that every possible preamble would have to be tested by the device.

In the exemplary embodiments, the process by which the secondary devices 110-130 contend for the available polling response slots may be configurable. For example, a persistent channel use operation utilizing a free slot counter (FSC) may be used. The device may start the FSC at zero. A contending device may send a UWB packet over a channel using a specific slot. For each UWB packet that is transmitted successfully, the device may increase the FSC, e.g., by one increment. For each UWB packet that is transmitted unsuccessfully, the device may decrease the FSC, e.g., by one increment. The device may continue to use the channel/slot in this manner as long as the FSC remains at zero or above. However, if the FSC goes below zero, the device will deem the channel/slot to be busy and will move to a different channel/slot.

The increment by which the FSC is increased or decreased may be a function of a number of consecutive attempts. For example, the FSC may be decreased by one after a first failed transmission. If the next transmission attempt also fails, the FSC may be decreased by 2, etc. In this manner, a device that has established a good connection in a given channel/slot will continue to use the same channel/slot, and a device that attempts to use the same channel/slot will move to a different channel/slot. This exemplary contention procedure is not limited to the exemplary ranging operations but may be applied to any scenario where devices are contending for transmission resources.

As described above, the exemplary embodiments are described with reference to devices that may operate according to the IEEE 802.15.4 standard for UWB networks. Thus, the exemplary MAC IE 500 may be a variation of a MAC IE according to this protocol. However, if the UWB network is operating using a different protocol, a MAC IE having different fields may be used to convey the information that is used for the above described ranging operations. In addition, the information that is used for the ranging operation may be communicated between the devices using information elements (or other data elements) of other layers.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made to the present disclosure, without departing from the spirit or the scope of the exemplary embodiments. Thus, it is intended that the present disclosure cover modifications and variations of the exemplary embodiments provided they come within the scope of the appended claims and their equivalent.

The invention claimed is:

1. A method, comprising:
   at a first device:
   transmitting a first ranging poll to a plurality of second devices, wherein the first ranging poll includes one of an identification of a type of ranging operation, a number of ranging rounds to be performed, a duration of a ranging round, a number of response slots, a ranging round counter, a pointer to a next ranging poll, an indication of whether the polling response messages are scheduled, a slot assignment for the polling response messages or a maximum number of attempts for each polling response message;
   receiving a polling response message from each of at least a first subset of the second devices;
   determining a respective propagation delay for each of the received polling response messages; and
   determining a respective distance to each of the first subset of the second devices based on at least the respective propagation delays.

2. The method of claim 1, further comprising:
   transmitting a second ranging poll to the plurality of second devices;
   receiving a time stamp response message from each of at least a second subset of the second devices; and
   determining a respective distance to each of the second subset of the second devices based on at least the respective time stamp response message.

3. The method of claim 1, further comprising:
   transmitting a pre-poll message including ranging configuration information to the plurality of second devices.

4. The method of claim 1, further comprising:
   transmitting time stamp information to the plurality of second devices.

5. The method of claim 1, wherein the first device and the plurality of second devices are communicatively coupled via an ultra-wideband (UWB) network.

6. The method of claim 1, wherein the transmitting the first ranging poll to the plurality of second devices is a broadcast transmission, wherein the first device and each of the plurality of second devices share a common key to exchange station-to-station messages.

7. The method of claim 1, wherein the transmitting the first ranging poll to the plurality of second devices is a multicast transmission based on the first device including information corresponding to a number of the plurality of second devices and an identity of each of the plurality of secondary devices.

8. A device, comprising:
   a transceiver configured to transmit a first ranging poll to a plurality of second devices and receive a polling response message from each of at least a first subset of the second devices, wherein the first ranging poll includes one of an identification of a type of ranging operation, a number of ranging rounds to be performed, a duration of a ranging round, a number of response slots, a ranging round counter, a pointer to a next ranging poll, an indication of whether the polling response messages are scheduled, a slot assignment for the polling response messages or a maximum number of attempts for each polling response message; and a processor configured to determine a respective propagation delay for each of the received polling response messages and determine a respective distance to each of the first subset of the second devices based on at least the respective propagation delays.

9. The device of claim 8, wherein the transceiver is further configured to transmit a second ranging poll to the plurality of second devices and receive a time stamp response message from each of at least a second subset of the second devices, wherein the processor is further configured to determine a respective distance to each of the second subset of the second devices based on at least the respective time stamp response message.

10. The device of claim 8, wherein the first device and the plurality of second devices are communicatively coupled via an ultra-wideband (UWB) network.

11. The device of claim 8, wherein the transmitting the first ranging poll to the plurality of second devices is a broadcast transmission, wherein the first device and each of the plurality of second devices share a common key to exchange station-to-station messages.

12. The device of claim 8, wherein the transmitting the first ranging poll to the plurality of second devices is a multicast transmission based on the first device including information corresponding to a number of the plurality of second devices and an identity of each of the plurality of secondary devices.

13. The device of claim 8, wherein the transceiver is further configured to transmit a pre-poll message including ranging configuration information to the plurality of second devices.

14. The device of claim 8, wherein the transceiver is further configured to transmit time stamp information to the plurality of second devices.

15. A processor of a first device configured to perform operations comprising:

transmitting a first ranging poll to a plurality of second devices, wherein the first ranging poll includes one of an identification of a type of ranging operation, a number of ranging rounds to be performed, a duration of a ranging round, a number of response slots, a ranging round counter, a pointer to a next ranging poll, an indication of whether the polling response messages are scheduled, a slot assignment for the polling response messages or a maximum number of attempts for each polling response message;

receiving a polling response message from each of at least a first subset of the second devices;

determining a respective propagation delay for each of the received polling response messages; and determining a respective distance to each of the first subset of the second devices based on at least the respective propagation delays.

16. The processor of claim 15, wherein the operations further comprise:

transmitting a second ranging poll to the plurality of second devices;

receiving a time stamp response message from each of at least a second subset of the second devices; and determining a respective distance to each of the second subset of the second devices based on at least the respective time stamp response message.

17. The processor of claim 15, wherein the operations further comprise:

transmitting a pre-poll message including ranging configuration information to the plurality of second devices.

18. The processor of claim 15, wherein the first device and the plurality of second devices are communicatively coupled via an ultra-wideband (UWB) network.

19. The processor of claim 15, wherein the transmitting the first ranging poll to the plurality of second devices is one of (i) a broadcast transmission, wherein the first device and each of the plurality of second devices share a common key to exchange station-to-station messages or (ii) a multicast transmission based on the first device including information corresponding to a number of the plurality of second devices and an identity of each of the plurality of secondary devices.

20. The processor of claim 15, wherein the operations further comprise:

transmitting time stamp information to the plurality of second devices.

* * * * *